(12) United States Patent
Hanich et al.

(10) Patent No.: US 6,228,160 B1
(45) Date of Patent: May 8, 2001

(54) STAINS WHICH BAKE TO A RED-BROWN COLOR, PROCESS FOR THEIR PREPARATION AND THEIR METHODS OF USE

(75) Inventors: Jurgen Hanich; Gillian-Ann Jaschik; Jörg Wacker, all of Frankfurt (DE); Giacinto Monari, Corlo (IT)

(73) Assignee: Cerdec Aktiengesellschaft Keramische Farben, Frankfurt (DE)

( * ) Notice: Subject to any disclaimer, the term of this patent is extended or adjusted under 35 U.S.C. 154(b) by 0 days.

(21) Appl. No.: 09/241,409

(22) Filed: Feb. 2, 1999

(30) Foreign Application Priority Data

Feb. 3, 1998 (DE) ............................................. 198 04 109

(51) Int. Cl.$^7$ ................................. C09C 1/22; C09C 1/24
(52) U.S. Cl. ........................... 106/456; 106/457; 106/460; 106/482
(58) Field of Search ..................................... 501/133, 154, 501/141; 106/456, 457, 460, 482

(56) References Cited

U.S. PATENT DOCUMENTS

| | | | |
|---|---|---|---|
| 1,719,432 | * 2/1929 | Kinzie | 106/450 |
| 2,347,630 | * 4/1944 | Harbert | 106/457 |
| 3,005,724 | * 10/1961 | Seabright | 106/457 |
| 3,166,430 | * 1/1965 | Seabright | 106/457 |
| 3,189,475 | * 6/1965 | Marquis et al. | 106/450 |
| 4,387,195 | * 6/1983 | Tully et al. | 501/154 |

* cited by examiner

Primary Examiner—Michael Marcheschi
(74) Attorney, Agent, or Firm—Wenderoth, Lind & Ponack, L.L.P.

(57) ABSTRACT

The invention provides new stains which fire to a red-brown color for coloring ceramic compositions. The stains comprise $Fe_2O_3$ and/or an Fe compound which forms $Fe_2O_3$ on firing, in uniform distribution in a pulverulent matrix based on an oxide-like and/or silicate-like material which is amorphous to X-rays to the extent of at least 50% and has a specific surface area (BET) of at least 40 $m^2/g$, and are obtainable by bringing the constituents into intensive contact together. The matrix preferably comprises 80 to 100% amorphous $SiO_2$ or $SiO_2$-rich silicate with a BET surface area of 90 to 300 $m^2/g$ and 0 to 20% of an auxiliary substance, such as silicone oil. The stains can be prepared by intensive dry grinding.

24 Claims, No Drawings ic compositions. The micronized red pigments mentioned are not suitable for use as stains in ceramic compositions. During firing, sintering of the $Fe_2O_3$ evidently occurs, and with this a change in color from red to brown.

STAINS WHICH BAKE TO A RED-BROWN COLOR, PROCESS FOR THEIR PREPARATION AND THEIR METHODS OF USE

BACKGROUND OF THE INVENTION

The invention relates to coloring bodies i.e. stains which fire to a red-brown color and comprise iron(III) oxide ($Fe_2O_3$) and/or one or more iron compounds which form $Fe_2O_3$ on firing, as the coloring component in uniform distribution in a pulverulent matrix based on an oxide-like and/or silicate-like material. The invention furthermore relates to a process for the preparation of the stains and their use for coloring ceramic compositions.

DESCRIPTION OF THE PRIOR ART

Iron-containing stains are widely used in the production of so-called Grés Porcellanato, a fine stoneware composition for fast firing which is gaining ever-increasing importance in modern tile production, in order to give the composition an attractive red-brown color after firing.

Grés de Thiviers, a naturally occurring stain comprising about 90% quartz and about 10% goethite (FeOOH) is used to produce red-brown color shades. In this naturally occurring product, the iron oxide hydrate is protected from chemical reaction with the constituents of the composition during firing at about 1100 to 1250° C. by a covering of quartz. Disadvantages of this stain are the variations in the color shade, the comparatively high concentration of coloring material needed to achieve attractive color shades, and the dwindling natural resources of this pigment. The search for synthetic products with the same or better properties than those of the natural product is therefore of great importance.

According to JP 02-263870 A, violet colored pigments are accessible if FeOOH, $SiO_2$ and $K_2CO_3$ are mixed, ground and calcined. The desired red-brown color shade is not obtained.

According to EP-A 0 563 688, red ceramic casting compositions can be produced by fast firing if clay is mixed, shaped and fired with customary additives and an iron oxide pigment. The pigment to be used must comprise less than 0.6% Si and less than 0.06% Mn, and comprises alpha-FeOOH, gamma-FeOOH, alpha-$Fe_2O_3$ and/or $Fe_3O_4$.

As has been found in practice, commercially obtainable iron oxide pigments, including those with the above mentioned criteria in respect of the Si and Mn content, are not very suitable for coloring in a low concentration by themselves or as a mixture with quartz, since the iron oxide substantially dissolves in the compositions. Although a coloring effect results at a higher concentration of iron oxide, this is nevertheless limited to unattractive brown color shades. The reason for these properties is to be seen in the fact that iron oxide tends towards crystal growth at a high temperature, and the resulting coarse-particled iron oxide leads to colors which are not very brilliant in the ceramic composition.

It is known from Europa Chemie 31–32/91, page 4, that the wetting properties of the Bayer pigment Bayferrox® are improved by an after-treatment with aluminum oxide and such micronized $Fe_2O_3$ red pigments are suitable for critical binder systems. The nature of the after-treatment, the amount of $Al_2O_3$ and the structure thereof cannot be found from this document. From experiments by the inventors of the present application, The micronized red pigments mentioned are not suitable for use as stains in ceramic compositions. During firing, sintering of the $Fe_2O_3$ evidently occurs, and with this a change in color from red to brown.

Ullmann's Enzykiopädie der technischen Chemie [Ullmann's 15 Encyclopaedia of Industrial Chemistry], 4th edition, volume 10, pages 437–438 describes compositions of enamels and glass fluxes for them. According to the definition for stains given on page 438, according to which the pigments contained therein do not change during stoving, a simple mixture of a glass frit and $Fe_2O_3$ can not be regarded as stain, because the iron oxide would dissolve in the flux during firing. The document says nothing about the preparation of the stain. Although the glass frits employed in enamels are amorphous, the specific surface area measured by the BET method is usually about/less than 1 $m^2/g$ and their $d_{50}$ value mostly about 1 µm.

DE 32 11 327 A1 relates to iron oxide pigments with an iron(II) oxide content (page 10, line 11). Conventional pigments comprising FeG are black and have a BET surface area of 12 to 18 $m^2/g$. Products which can exceed 40 $m^2/g$ are used only for magnetic purposes. Contrary to said document the present invention relates to stains which fire to a red-brown color and not a black color.

The inventors of the present application have attempted to coat iron oxide pigments with silica by a precipitation process in order to arrive at products with similarly good stain properties as Grés de Thiviers. In spite of a coating process, which was suitable per se, no products in which the thickness of the coating was sufficient to withstand attack by the constituents of the ceramic composition were accessible. Furthermore, a particle growth and therefore a reduction in the color brilliance occurred at a high temperature.

Another attempt was directed towards joint precipitation of silica and iron hydroxide from water-glass and iron salt solutions. Because of the fine division of the iron hydroxide formed and its high reactivity at a high temperature, these precipitated products were again exposed to considerable crystal growth; color shades, which were not very attractive, were the consequence.

A stain based on $Fe_2O_3$ in a matrix of crystalline $SiO_2$ is commercially obtainable—CK 32055 from Ferro. In the coloring of ceramic compositions, this stain leads to colors of high blue content (high b* value) and inadequate depth of color (high L* value), determined in the CIELAB system in accordance with DIN 5033.

A coloristically improved product is the commercially obtainable CP RE-18 from Ithaka (JP). This stain comprises about 10 wt.-% $Fe_2O_3$ in a matrix of silica ($SiO_2$), of which about 15 wt.-% is crystalline and about 85 wt.-% is amorphous. According to trans-electron microscopy (TEM), the amorphous $SiO_2$ is in the form of substantially spherical particles with a particle diameter of 40 nm. The specific surface area of the stain, determined by the BET ($N_2$) method in accordance with DIN 66131, is 36 $m^2/g$.

SUMMARY OF THE INVENTION

The object of the invention is to provide a further stain for coloring ceramic compositions which is easily accessible in an economic manner and allows the production of brilliant red-brown ceramic tiles of intense color in a reliable manner.

DETAILED DESCRIPTION OF THE INVENTION

A stain, which fires to a red-brown color, comprising $Fe_2O_3$ and/or one or more iron compounds, which form $Fe_2O_3$ during firing, as coloring component in uniform distribution in a pulverulent matrix based on an oxide-like and/or silicate-like material, has been found, which is characterized in that the oxide-like and/or silicate-like material of the matrix has a specific surface area measured by the BET method (DIN 66131) equal to or greater than 40 m$^2$/g and is amorphous to X-rays to the extent of at least 50 %, the stain comprises the coloring components in an amount of 1 to 25 wt. %, calculated as $Fe_2O_3$, and in that it is obtainable by bringing the coloring components and the oxide-like and/or silicate-like material into intensive contact with one another.

Stains according to the invention are obtainable by uniform distribution of the coloring component in a pulverulent matrix based on an oxide-like and/or silicate-like material, the coloring iron compound(s) and the oxide-like and/or silicate-like material of the matrix, including auxiliaries optionally present, being mixed and/or ground together intensively, that is to say with the introduction of an effective amount of mechanical energy, in a device for mixing and/or grinding.

Bringing the base material of the matrix and the coloring component into intensive contact with one another is of importance for the formation of the color of high red content, high brilliance and intensity which is red-brown when baked. Simple dry mixing of the constituents, for example treatment in an impact mill for 2 minutes, such as is sufficient for the preparation of conventional stains of metal oxides, is inadequate for the preparation of stains according to the invention, because the red value a* and the chroma value C* are much too low and the L* value is much too high (Cielab system according to DIN 5033, part 3). An increase in the red value a* and a reduction in the blue value b* and the L* value can be effected by bringing the components into more intensive contact, for example grinding in an intensive mixing/grinding device for 0.1 to 10 hours. The components can be brought into contact in this way in the wet or dry state, and are preferably brought into contact in the dry state, because in this case the desired color values can be achieved in a shorter time. Using an intensive mixing/grinding device, such as, in particular, an attrition mixer, a vibratory mill or a ball mill, the desired color values in general can be obtained within about half an hour to 5 hours in a dry mixing/grinding treatment. The expert will operate the mixing/grinding device to be used such that effective friction is achieved between the constituents in the shortest possible time. By the introduction of mechanical energy into the powder mixture, if the conventional iron oxide pigments or sources of these are used, these are dispersed in the matrix in an effective manner. To achieve good color values of preferred stains, substantial embedding or covering of the Fe source, such as, in particular, an iron oxide from the series consisting of $Fe_2O_3$, FeOOH and $Fe_3O_4$, in a preferably completely amorphous silica or an $SiO_2$-rich silicate is necessary. As a result of the mechanical energy introduced into the powder mixture, the iron oxide is de-agglomerated and dispersed and is distributed over the large surface area of the carrier material (=matrix), which in its turn is disintegrated, distributed and is covered by this for the most part. The crystal growth which usually starts at a high temperature, that is to say during firing, and the associated change in color shade to blue and less red are suppressed effectively by the spatial separation of the iron oxide particles from one another. A sufficiently large surface area of the carrier material is important for the quality of the pigment, so that adequate spatial separation of the iron oxide crystallites is possible.

It has been found that by co-using an auxiliary substance from the series consisting of silicone oils, such as, in particular, poly(dimethylsiloxane), and the alkoxysilanes of the general formula $(RO)_{4-n}SiR'_n$ or lower condensation products thereof, stains with further improved color values can be obtained. In the general formula, R' represents an organic radical which is bonded to the Si atom via a C atom, for example a $C_1$- to $C_8$- alkyl group, an ω-aminoalkyl group, a methacryloyloxyalkyl group or a sulfidic group, e.g. —$(CH_2)_3$—$S_4$—$(CH_2)_3$—$Si(OR)_3$; R represents a lower alkyl radical, such as methyl, ethyl, n- and iso-propyl; n in the formula represents an integer 0, 1, 2 or 3. Such auxiliary substances are usually employed in an amount of 0.1 to 10 wt.-%, in particular 0.5 to 3 wt.-%, in each case based on the matrix; the amount employed can also be increased further, for example to 20 wt.-%, based on the matrix, but no further improvement is achieved as a result. By co-using the auxiliary substance mentioned, the a* value can be increased by a few units, under otherwise the same grinding/mixing conditions, or the mixing/grinding time to obtain the required color values can be shortened.

Preferred stains which fire to a red-brown color have, when used for coloring a fine stoneware composition (Gréas Porcellanato) with 4 wt.-% stain with an $Fe_2O_3$ content of 10 wt.-%, the following color values—measured in the Cielab system (DIN 5033)—after firing:
L* less than 60, in particular 50 to 57;
a* greater than 10, in particular 12 to 18;
10 to 18, in particular 12 to 15.

Features which are essential to the invention are directed at the choice and the substance data of the base material of the matrix: The base material can be oxide-like and/or silicate-like in nature. Oxides which may be mentioned in particular are: silica ($SiO_2$), $B_2O_3$, $Al_2O_3$, $SnO_2$, $Bi_2O_3$ and oxides of the elements of sub-groups 3 to 5, in particular $TiO_2$ and $ZrO_2$. Mixed oxides, such as spinels and perowskites, which can also comprise alkaline earth metal and/or alkali metal oxides in addition to the oxides mentioned, are also possible as the base material. Particularly preferably, the base material is made of $SiO_2$, or $SiO_2$ is at least the main constituent thereof. The silicate-like base materials are preferably silicates of alkali, alkaline earth and earth metals and mixtures thereof, the metals mentioned expediently being present in an amount below the stoichiometric amount. $SiO_2$-rich silicates, such as products with an $SiO_2$ content of 80 to 95 wt.-%, are therefore preferred; examples of these are commercially available products from Degussa AG, such as Extrusil (91% $SiO_2$, 6% CaO, 2% $Na_2O$) and Pasilex (82% $SiO_2$, 9.5% $Al_2O_3$, 8% CaO). The base material can be hydrophilic or hydrophobic, and is usually hydrophilic.

The matrix base material which is to be used for the preparation of the stain and is a single substance or a substance mixture should be amorphous to X-rays to the extent of at least 50%, preferably more than 90%, and particularly preferably to the extent of more than 99%, and have a specific surface area measured by the BET method (DIN 66131 with $N_2$ as the measuring gas) equal to or greater than 40 m$^2$/g, preferably 90 to 300 m$^2$/g, and in particular 100 to 200 m$^2$/g. According to a particularly preferred embodiment, the base material substantially comprises, that is to say to the extent of 90 to 100%, $SiO_2$ which is amorphous to X-rays and/or $SiO_2$-rich silicate which is amorphous to X-rays, in each case with a BET surface area in the range from 90 to 300 m$^2$/g. It has been found that the amorphous character is essential, because it was not possible to arrive at a usable stain by using very finely ground quartz powder instead of amorphous silica. The primary particle size of preferred oxide-like and/or silicate-like materials of the matrix is preferably less than 30 nm, in particular about 20 nm; the shape of the primary particles is irregular.

The oxide-like and/or silicate-like materials which have a structure which is completely or predominantly amorphous to X-rays and the required BET surface area and are contained as the base material in the stains can be obtained by known precipitation processes or by hydrothermal synthesis. The amorphous oxides are also obtainable by pyrogenic processes, for example the known Aerosil process or arc process. Oxides produced pyrogenically by the Aerosil process are less preferred because of the low tamped density. Silicas and silicates produced by precipitation processes are particularly preferred—examples of such substances can be found in the company brochure "precipitated silicas and silicates" (3/88) of Degussa AG.

The stains can comprise conventional iron oxides or oxide hydrates, such as, in particular, $Fe_2O_3$, α- and γ-FeOOH and $Fe_3O_4$, as the coloring component. Alternatively or in addition to this, one or more di- and/or trivalent Fe compounds which form $Fe_2O_3$ during firing, such as sulfates, halides, carbonates, basic carbonates, nitrates or acetates, can be present. Preferably, the stains comprise one of the above mentioned oxides or oxide hydrates, which are already commercially obtainable in pigment quality, directly. The average particle diameter of the source of $Fe_2O_3$ is preferably less than 2 μm, in particular less than 1 μm, and particularly preferably less than 0.2 μm; the particle spectrum is preferably narrow. The Fe source of the coloring component is expediently contained in the stain in a total amount of 1 to 25 wt.-%, in particular 5 to 15 wt.-%, calculated as $Fe_2O_3$ and based on the stain.

As already stated above, in addition to the oxide-like and/or silicate-like material, the matrix can also comprise auxiliary substances for modification of the color and/or improved processing. In addition to the silicone oils and alkoxysilanes mentioned, the auxiliary substances can be, for example, conventional grinding auxiliary substances, other pigments, fatty acid salts and waxes. If the matrix comprises auxiliary substances, the amount thereof is in the range of greater than 0 to 20 wt.-%, in particular in the range from 0.1 to 10 wt.-%. The matrix expediently comprises 80 to 100 wt.-6 of an oxide-like and/or silicate-like material and 0 to 20 wt.-% of auxiliary substances.

As shown above, the stains according to the invention can be obtained in a simple manner by bringing the constituents into intensive contact together. The process can be carried out easily and therefore economically. If desired, after the components have been brought into contact, a thermal treatment at 500 to 800° C. can follow, in order to remedy the lattice defects in the iron oxide which occur when the components are brought into contact. However, such a treatment in general has only a slight effect on the color values, so that it can usually be omitted.

The stains which fire to a red-brown can be employed for coloring ceramic compositions, such as, in particular, stoneware and fine stoneware compositions, which usually comprise 40 to 60% clays, 20 to 40% feldspars, 5 to 15% rubble and 0 to 5% lime. They are furthermore suitable for the preparation of decorative paints such as can be used for direct decoration and indirect decoration, that is to say via transfer, of ceramic substrates, such as glass, porcelain and ceramic.

The stains according to the invention are distinguished by good color values and easy accessibility. At the same Fe content in the stain and the same amount of stain in a fine stoneware composition, more brilliant dyeings of more intensive color are obtainable than with the naturally occurring product Grés de Thiviers usually used hitherto. Compared with a synthetic stain with substantially crystalline $SiO_2$ in the matrix, the stains according to the invention are distinguished by a lower blue value (b*) and a lower L* value.

The invention is explained further with the aid of the examples and comparison examples.

General instructions for the preparation of the stains:

The source of $Fe_2O_3$ and constituents of the matrix—unless stated otherwise, 10 wt.-%, calc. as $Fe_2O_3$, and 90 wt.-% matrix, based on the stain—were brought into contact with one another in a mixing/grinding device. The mixture heated up due to the intensive contact between the components. The time the components were brought into contact was determined with the aid of a specimen firing. For bringing the components into contact in a ball mill, the contact time was 2 hours.

General instructions for testing the stains:

A ceramic fine stoneware composition (Grés Porcellanato from Cerdisa, Fiorano (IT)) was mixed with the stain—unless stated otherwise, 4 wt.-% stain and 96 wt.-% ceramic composition. After the composition had been homogenized, it was moistened with 4% water, shaped to test specimens in a laboratory press and then, after pre-drying, fired at 1225° C. in the course of 60 minutes (cold—cold). The color values of the fired stoneware articles were determined by the Cielab method (DIN 5033, part 3) by means of a commercially available color-measuring apparatus (10° observer, standard light D 65).

EXAMPLES

Example B 1 and Comparison Examples VB1 to VB 5

Stain body FK/B 1 according to the invention was prepared in accordance with the general instructions from 10 wt.-% $Fe_2O_3$ pigment (L 2915 from BASF) and 90 wt.-% precipitated silica (FK 320 DS from Degussa AG), which was amorphous and had a BET surface area of 170 $m^2/g$, by dry grinding in a ball mill for 2 hours.

Stain FK/VB 5, which was not according to the invention, was prepared in a corresponding manner with the same color pigment and quartz powder ($d_{50}$ 2 μm).

The color values (measured by the Cielab method) of test specimens of a fine stoneware composition colored with different stains and fired are given in the following table.

| No. | Stain (FK) | Amount of FK in the composition (wt.-%) | L* | a* | b* | C* |
| --- | --- | --- | --- | --- | --- | --- |
| VB 1 | Grés de Thiviers | 4 | 59.1 | 12.9 | 14.8 | 19.6 |
| VB 2 | Grés de Thiviers | 8 | 52.2 | 15.2 | 15.4 | 21.6 |
| VB 3 | CK 32055 (Ferro) | 4% | 56.7 | 15.0 | 17.3 | 22.9 |
| VB 4 | CP-RE-18 (Ithaka (JP)) | 4% | 51.9 | 16.4 | 12.5 | 20.6 |
| VB 5 | FK/VB 5 | 4% | Color is destroyed completely during firing | | | |
| B 1 | FK/B1 | 4 | 51.9 | 17.4 | 14.5 | 22.7 |

Stain FK/B 1 according to the invention has a higher red value a* and a higher brilliance (=higher chroma value C*)

compared with the commercial product from Ithaka. Comparison example VB 3, the stain of which comprises a matrix of crystalline $SiO_2$, shows an inadequate depth of color and is bluish-tinged. The stain of comparison example VB 5 shows no pigment properties.

Examples B 2 to B 4

The influence of the $Fe_2O_3$ content in the stain was investigated. The matrix always comprised the precipitated silica FK 320 DS; $Fe_2O_3$ was employed in pigment quality. Preparation of the stain by dry grinding in a ball mill for 2 hours. Test coloration with 4% stain.

| $Fe_2O_3$ content wt.-% in the Stain | Color values of the test specimen | | |
|---|---|---|---|
| | L* | a* | b* |
| 5 | 55.7 | 15.9 | 14.2 |
| 10 | 51.6 | 15.7 | 12.5 |
| 20 | 50.2 | 9.1 | 9.9 |

By adjusting the $Fe_2O_3$ content, the color properties can be influenced within a wide range. By increasing the $Fe_2O_3$ content in the stain from 10 to 20 wt.-%, the L* value falls, that is to say the color becomes darker, but at the same time the a* (red) and the chroma value (brilliant) decrease.

Examples B 5 to B 8

The influence of the specific surface area of the precipitated silica employed for the matrix was investigated. The stains were prepared in accordance with the general instructions, an $Fe_2O_3$ pigment of Chinese origin being employed in an amount of in each case 10 wt.-%. The table shows the results of the coloring of the composition with 4% stain.

| No. | Matrix *) | BET ($N_2$) $m^2/g$ | L* | a* | b* |
|---|---|---|---|---|---|
| B 5 | Sident 9 | 45 | 58.2 | 12.1 | 13.4 |
| B 6 | Ultrasil VN 3 | 170 | 53.7 | 15.0 | 12.8 |
| B 7 | FK 320 (ground) | 175 | 53.2 | 15.9 | 13.7 |
| B 8 | FK 700 | 700 | 57.0 | 12.5 | 13.6 |

*) The names are trade names of Degussa AG

A silica with a comparatively low BET surface area (45 $m^2/g$) leads to a stain which is colored significantly less red and less intensively than a stain obtained using a silica of about 170 m/g A very high BET surface area—e.g. 700 $m^2/g$—of the matrix also leads to a reduction in the color properties.

Examples B 9 to B 14

The influence of the quality of the Fe oxide pigments or sources of these employed was investigated. The matrix comprised the precipitated silica Fk 320. The amount of Fe oxide pigment, calculated as $Fe_2O_3$, in the stains was 10 wt.-%. The coloring in the composition was 4%, as usual. The results are set forth the following table.

| No. | Fe oxide source | L* | a* | b* |
|---|---|---|---|---|
| B 9 | Chinese origin | 53.2 | 15.9 | 13.7 |
| B 10 | Bayferrox 120 M (Bayer AG) | 55.3 | 13.6 | 12.2 |
| B 11 | Bayferrox 130 B (Bayer AG) | 56.3 | 10.9 | 10.2 |
| B 12 | Sicotrans L 2915 (BASF AG) | 56.6 | 15.8 | 17.2 |
| B 13 | Fe-oxide yellow 920 (Bayer AG) (= FeOOH) | 54.2 | 14.1 | 13.2 |
| B 14 | Fe(II) sulfate | 64.5 | 7.0 | 14.4 |

The Fe source was present as $Fe_2O_3$ in stains B 9 to B 12 and as FeOOH in B 13. The more finely divided the pigment, the redder the color of the stain after firing, and a primary particle size of the pigment of about/less than 100 nm is particularly preferred. In another example, B 14, iron(II) sulfate was employed as the $Fe_2O_3$-forming Fe compound; an improvement in the color values is to be expected by optimizing the Fe compound.

Comparison Example VB 6 and Example B 16

The influence of the intensity with which the components are brought into contact on the color values of the stain—90 wt.-% matrix of amorphous silica FK 320 and 10 wt.-% $Fe_2O_3$ (Chinese origin)—was investigated. The following table shows the color values of the colored and fired ceramic composition.

| No. | Contact conditions | L* | a* | b* |
|---|---|---|---|---|
| VB 6 | Impact mill 2 minutes | 66 | 3.2 | 14.3 |
| B 16 | Wet ball mill 2 hours | 60.2 | 7.7 | 10.2 |
| B 9 | Dry ball mill 2 hours | 53.2 | 15.9 | 13.7 |

Examples B 17 and B 18

A stain of 10 wt.-% $Fe_2O_3$ pigment and 90 wt.-% of a matrix of 97.5 wt.-% precipitated silica FK 320 and 2.5 wt.-% silicone oil, as an auxiliary substance, was prepared (dry grinding in a ball mill for 2 h). The table shows the color values of the colored and fired test specimens of these examples compared with the analogous stains from the same pigment and the same silica, which was prepared in the absence of the auxiliary substance (B 9).

| No. | Stain | Grinding time (minutes) | L* | a* | b* |
|---|---|---|---|---|---|
| B 17 | with silicone oil | 60 | 53.4 | 16.2 | 13.6 |
| B 18 | with silicone oil | 120 | 53.4 | 17.3 | 15.2 |
| B 9 | without silicone oil | 120 | 53.2 | 15.9 | 13.7 |

Example B 19

The influence of the after-heating of the stain—2 h at 700° C.—on the color values was investigated. The table shows the color values of the test specimen with stain FK/B 1, used as the starting substance, and with the heat-treated product FK/B 19 prepared therefrom.

| No. | Stain | L* | a* | b* |
|---|---|---|---|---|
| B 1 | FK/B 1 (without heat treatment) | 54.5 | 14.8 | 15.2 |
| B 19 | FK/B 19 (with heat treatment) | 53.4 | 15.9 | 15.5 |

We claim:
1. A red-brown stain consisting of:
   (a) a coloring component comprising one or more iron compounds selected from the group consisting of $Fe_2O_3$ FeOOH, $Fe_3O_4$ and iron containing compounds which form $Fe_2O_3$ on baking, and
   (b) a pulverulent matrix comprising 80 to 99.9 wt % of an oxide and/or silicate and 0.1 to 20 wt. % of one or more auxiliary substances selected from the group consisting of silicone oils, alkoxysilanes and lower condensation products thereof, said oxide and/or silicate (i) having a specific surface; area measured by the BET method (DIN 66131) of at least 40 $m^2/g$ and (ii) being at least 50% amorphous,
   said coloring component, calculated as $Fe_2O_3$, (1) being present in an amount of 1 to 25 wt. %, (2) being uniformly distributed in said pulverulent matrix and (3) being in intensive contact with said oxide and/or silicate of said pulverulent matrix.
2. The stain according to claim 1, wherein the oxide and/or silicate is at least 90% amorphous.
3. The stain according to claim 2, wherein the oxide and/or silicate is more than 99% amorphous.
4. The stain according to claim 1, wherein the oxide and/or silicate comprises $SiO_2$ or $SiO_2$-rich silicate, respectively.
5. The stain according to claim 4, wherein the $SiO_2$ or $SiO_2$-rich silicate is more than 99% amorphous.
6. The stain according to claim 1, wherein the oxide and/or silicate is produced by a precipitation process or a hydrothermal process.
7. The stain according to claim 1, wherein the oxide and/or silicate has a specific surface area measured by the BET method (DIN 66131) of 90 to 300 $m^2/g$.
8. The stain according to claim 7, wherein the oxide and/or silicate has a specific surface area measured by the BET method (DIN 66131) of 100 to 200 $m^2/g$.
9. The stain according to claim 1, wherein the coloring component, calculated as $Fe_2O_3$, is present in an amount of 5 to 15 wt. %.
10. The stain according to claim 1, wherein the coloring components, $Fe_2O_3$, FeOOH and $Fe_3O_4$, each has a particle diameter of less than 2 $\mu$m.
11. The stain according to claim 1, wherein the pulverulent matrix comprises 90 to 99.9 wt. % of an amorphous silica and/or an amorphous $SiO_2$-rich silicate and comprises 0.1 to 10 wt. % of a silicone oil.
12. The stain according to claim 1, wherein said intensive contact results in a fine stoneware composition, colored with 4 wt. % of a stain comprising 10 wt. % $Fe_2O_3$, having the following color values in the CIE-Lab system after firing: (i) L* being less than 60, (ii) a* being greater than 10, (iii) b* being between 10 to 18.
13. The stain according to claim 12, wherein (a) L* is 50 to 57 and/or (b) a* is 12 to 18.
14. A process for preparing a red-brown stain consisting of:
   uniformly distributing a coloring component in a pulverulent matrix, said coloring component, calculated as $Fe_2O_3$, being present in an amount of 1 to 25 wt. % and comprising one or more iron compounds selected from the group consisting of $Fe_2O_3$, FeOOH, $Fe_3O_4$ and iron containing compounds which form $Fe_2O_3$ on baking, said pulverulent matrix comprising 80 to 100 wt. % of an oxide ansior silicate and 0 to 20 wt. % of one or more auxiliary substances for modifying color and/or processing, said oxide and/or silicate (i) having a specific surface area measured by the BET method (DIN 66131) of at least 40 $m^2/g$ and (ii) being at least 50% amorphous, and
   mixing and/or grinding intensively together said coloring component and said pulverulent matrix so that said coloring component is in intensive contact with said oxide and/or silicate of said pulverulent matrix.
15. The process according to claim 14, wherein said coloring component and said pulverant matrix are mixed and/or ground in a dry state.
16. The process according to claim 14, wherein said intensive mixing and/or grinding occurs in a mixing and/or grinding device.
17. The process according to claim 14, wherein the mixing and/or grinding device is an attrition mixer, a vibratory mill or a ball mill.
18. A method of using the red-brown stain of claim 1, comprising using said red-brown stain to (a) color ceramic compositions or (b) prepare decorative paints and/or transfers for decorating ceramic substrates.
19. The method according to claim 18, wherein the ceramic compositions are fine stoneware compositions.
20. The method according to claim 18, wherein the ceramic substrates are ceramic, porcelain or glass.
21. A process for preparing a red-brown stain consisting of:
   uniformly distributing a coloring component in a pulverulent matrix, said coloring component, calculated as $Fe_2O_3$, being present in an amount of 1 to 25 wt. % and comprising one or more iron compounds selected from the group consisting of $Fe_2O_3$, FeCOHO $Fe_3O_4$ and iron containing compounds which form $Fe_2O_3$ on firing, said pulverulent matrix comprising 80 to 100 wt. % of ail oxide and/or silicate and 0 to 20 wt. % of one or more auxiliary substances selected from the group onsisting of silicone oils, alkoxysilanes and lower condensation products thereof, said oxide and/or silicate (i) having a specific surface area measured by the BET method (DIN 66131) of at least 40 $m^2/g$ and (ii) being at least 50% amorphous, and
   mixing and/or grinding intensively together said coloring component and said pulverulent matrix so that said coloring component is in intensive contact with said oxide and/or silicate of said pulverulent matrix.
22. The process according to claim 21, wherein said coloring component and said pulverulent matrix are mixed and/or ground in a dry state.
23. The process according to claim 21, wherein said intensive mixing and/or grinding occurs in a mixing and/or grinding device.
24. The process according to claim 21, wherein the mixing and/or grinding device is an attrition mixer, a vibratory mill or a ball mill.

* * * * *